(12) United States Patent
Fisher

(10) Patent No.: US 7,179,535 B2
(45) Date of Patent: Feb. 20, 2007

(54) POLYMER SHEETS AND MULTIPLE LAYER GLASS PANELS HAVING ADJUSTABLE TINT

(75) Inventor: William Keith Fisher, Suffield, CT (US)

(73) Assignee: Solutia Incorporated, St. Louis, MO (US)

( * ) Notice: Subject to any disclaimer, the term of this patent is extended or adjusted under 35 U.S.C. 154(b) by 265 days.

(21) Appl. No.: 10/736,695

(22) Filed: Dec. 17, 2003

(65) Prior Publication Data

US 2005/0136243 A1    Jun. 23, 2005

(51) Int. Cl.
*B32B 17/10* (2006.01)
(52) U.S. Cl. .................. 428/437; 252/583; 359/252; 359/253; 359/254
(58) Field of Classification Search ............... 428/437; 252/583; 359/252, 253, 254
See application file for complete search history.

(56) References Cited

U.S. PATENT DOCUMENTS

| | | | |
|---|---|---|---|
| 4,893,908 A | 1/1990 | Wolf et al. |
| 5,042,923 A | 8/1991 | Wolf et al. |
| 5,178,571 A | 1/1993 | Mase |
| 5,239,406 A | 8/1993 | Lynam |
| 5,390,045 A | 2/1995 | Bernard, Jr. |
| 5,523,877 A | 6/1996 | Lynam |
| 5,587,828 A | 12/1996 | Bernard, Jr. |
| 5,680,245 A | 10/1997 | Lynam |
| 5,864,419 A | 1/1999 | Lynam |
| 5,986,797 A | 11/1999 | Lynam |
| 6,045,955 A | 4/2000 | Vincent |
| 6,120,588 A | 9/2000 | Jacobson |
| 6,120,839 A | 9/2000 | Comiskey et al. |
| 6,122,093 A | 9/2000 | Lynam |
| 6,160,655 A | 12/2000 | Fix et al. |
| 6,333,592 B1 | 12/2001 | Sasa et al. |
| 6,391,400 B1 | 5/2002 | Russell et al. |
| 6,391,462 B1 | 5/2002 | Jang |
| 6,466,298 B1 | 10/2002 | Fix et al. |
| 6,469,685 B1 | 10/2002 | Woodruff et al. |
| 6,671,008 B1 | 12/2003 | Li et al. |
| 2002/0018890 A1 | 2/2002 | Sugimachi |
| 2002/0135860 A1 | 9/2002 | Iwanaga |
| 2003/0086149 A1 | 5/2003 | Kawai |
| 2003/0096113 A1 | 5/2003 | Jacobson et al. |

FOREIGN PATENT DOCUMENTS

WO    WO 03/050607    6/2003

OTHER PUBLICATIONS

Templeton et al., Solvent Refractive Index and Core Charge Influences on the Surface Plasmon Absorbance of Alkanethiolate Monolayer-Protected Gold Clusters, *J. Phys. Chem. 104*:564-570 (2000).
Kreibig and Genzel, Optical Absorption of Small Metallic Particles, *Sur. Sci.*, 156:678-700 (1985).
Liz-Marzan and Mulvaney, The Assembly of Coated Nanocrystals, *J. Phys. Chem. B. 107*:7312-26 (2003).
Kim, Tuning the Optical Properties of Large Gold Nanoparticle Arrays, *Mat. Res. Soc. Symp. Proc. 676*:Y6.1.1-Y6.1.7 (2001)).
Giersig and Mulvaney, Preparation of Ordered Colloid Monolayers by Electrophoretic Deposition, *Langmuir 9*:3408-3413 (1993).
Comiskey et al., An Electrophoretic Ink for All-printed Reflective Electronic Displays, *Nature 394*:253-255 (Jul. 16, 1998).
Mulvaney et al., Silica Encapsulation of Quantum Dots and Metal Clusters, *J. Mater. Chem. 10*:1259-1270, Apr. 2000.

*Primary Examiner*—D. S. Nakarani
(74) *Attorney, Agent, or Firm*—Brenc Law

(57) ABSTRACT

The present invention is in the field of polymer sheets and multiple layer glass panels having adjustable tint, and, more specifically, the present invention is in the field of polymer sheets and multiple layer glass panels comprising agents that cause a change in light transmission properties when subjected to an electric field.

25 Claims, 10 Drawing Sheets

POLYMER SHEETS AND MULTIPLE LAYER GLASS PANELS HAVING ADJUSTABLE TINT

FIELD OF THE INVENTION

The present invention is in the field of polymer sheets and multiple layer glass panels having adjustable tint, and, more specifically, the present invention is in the field of polymer sheets and multiple layer glass panels comprising agents that cause a change in light transmission properties when subjected to an electric field.

BACKGROUND

It has long been desirable to develop windows and glass products having light reflection and transmission properties that can be adjusted by an end user of the products. For example, adjustable tinting in a window would allow a user to increase light absorption, scattering, or reflection in the window at will, thereby reducing the amount of light that is transmitted through the window. Such a product could allow a user to adjust tint in order to suit privacy needs or total light needs, for example.

Conventional attempts at producing an adjustable tint window, however, have resulted in products with less than ideal characteristics. For example, windows using electrochromate oxidation reduction systems, or polymer disperse liquid crystal and suspended particle devices, can be very slow to convert from a non-tinted state to a tinted state after application of a voltage. This lag time is generally undesirable. Further, some conventional products have unacceptably high levels of haze. Additionally, conventional adjustable tint products can require the constant application of a voltage potential in order to maintain a tinted state, which both increases the complexity of use and cost, and limits the range of applications for the product.

Accordingly, further improved compositions and methods are needed to impart adjustable tint capability to polymer sheets and multiple layer glass products, and specifically to laminated glass panels comprising poly(vinyl butyral) layers and polyethylene terephthalate layers, so as to impart desirable, adjustable light transmission qualities on the finished glass panel.

SUMMARY OF THE INVENTION

The present invention is in the field of polymer sheets and multiple layer glass panels having adjustable tint, and, more specifically, the present invention is in the field of polymer sheets and multiple layer glass panels comprising agents that cause a change in light transmission properties when subjected to an electric field.

The present invention includes a polymer sheet comprising: a polymeric layer; and, a plurality of domains distributed throughout said polymeric layer, wherein said domains comprise an agent that causes an alteration in the amount of visible light that can be transmitted through said polymer sheet in response to the application of an electric field to said polymer sheet.

The present invention includes a multiple layer glass panel, comprising: a first layer comprising, a polymeric layer; and, a plurality of domains distributed throughout said polymeric layer, wherein said domains comprise an agent that causes an alteration in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer.

The present invention includes a multiple layer glass panel, comprising: a first layer comprising an electrically conductive polymeric sheet; and, a second layer comprising an electrically conductive polymeric sheet; wherein said first layer and said second layer are bonded together by a binder comprising a plurality of domains distributed throughout said binder, wherein said domains comprise an agent that causes an alteration in the amount of visible light that can be transmitted through said glass panel in response to the application of an electric field to said binder.

The present invention includes a method of reducing light transmission through an opening, comprising: providing a multiple layer glass panel in said opening, wherein said multiple layer glass panel comprises a first layer comprising, a polymeric layer; and, a plurality of domains distributed throughout said polymeric layer, wherein said domains comprise an agent that causes a reduction in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer; and, connecting a voltage source to said second layer and said third layer, thereby generating an electric field across said first layer.

The present invention includes a method of reversibly reducing light transmission through an opening, comprising: providing a multiple layer glass panel in said opening, wherein said multiple layer glass panel comprises a first layer comprising, a polymeric layer; and, a plurality of domains distributed throughout said polymeric layer, wherein said domains comprise an agent that causes an alteration in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer; connecting a voltage source to said second layer and said third layer, thereby generating an electric field across said first layer; and, reversing the polarity of said voltage source to said second layer and said third layer, thereby reversing said electric field.

The present invention includes a multiple layer glass panel comprising: a first glass layer having an electrically conductive coating; a second glass layer having an electrically conductive coating; a polymeric layer disposed between said first glass layer and said second glass layer; and, a plurality of domains distributed throughout said polymeric layer, wherein said domains comprise an agent that causes an alteration in the amount of visible light that can be transmitted through said polymer layer response to the application of an electric field to said polymer layer.

The present invention includes a multiple layer glass panel, comprising: a first glass layer having an electrically conductive coating; a second glass layer having an electrically conductive coating; wherein said first glass layer and said second glass layer are bonded together by a binder comprising a plurality of domains distributed throughout said binder, wherein said domains comprise an agent that causes an alteration in the amount of visible light that can be transmitted through said glass panel in response to the application of an electric field to said binder.

DETAILED DESCRIPTION

Figure 1:
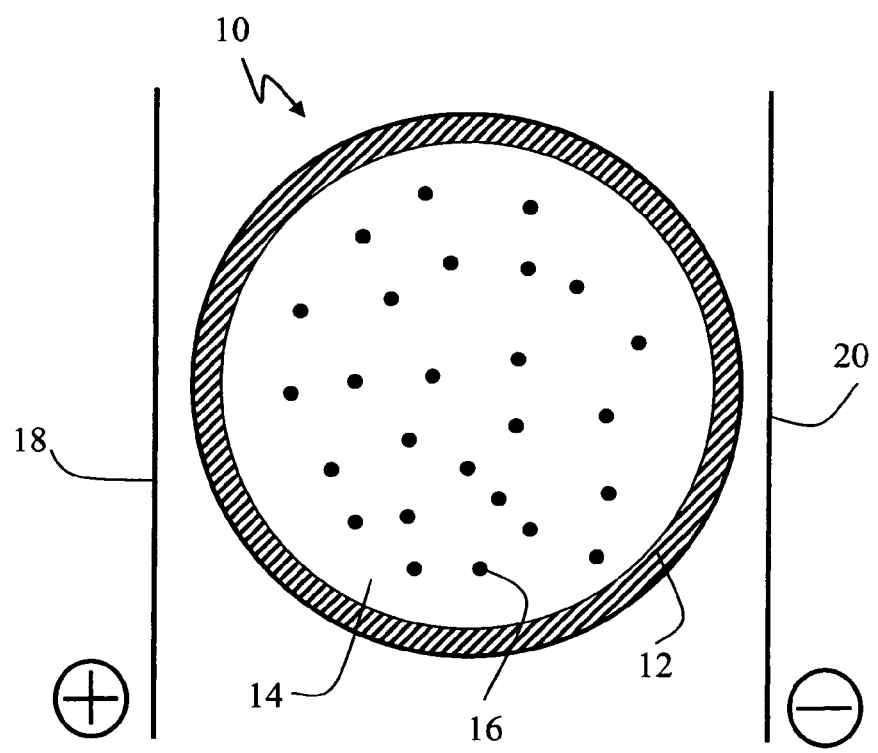
FIG. 1 represents a schematic illustration of a cross section of a domain disposed between two electrodes prior to application of a voltage to the electrodes.

The present invention involves the use of various agents that are capable of altering light transmission characteristics of a material when those agents are subjected to an electric field. In particular, agents that have a charge and can move in a medium when subjected to an electric field are used in the present invention in multiple layer glass panels, polymer layers, and other applications to create products that can be tinted by the application of a voltage. In various embodiments of the present invention the tintable products are reversibly tintable by reversing the polarity of the electric field. Products within the scope of the present invention include multiple layer, laminated glass panels, glass display panels, vision correction glasses and sunglasses, applications for which nonreversible tinting is desirable, and other applications in which adjustable tinting of glass products is desirable.

Tinting of the glass products of the present invention is achieved by subjecting one or more of various layers of material that comprise specific agents to an electric field, thereby causing a change in the light absorbing, reflecting, or scattering characteristics of the agents. For example, prior to application of an electric field, the agents of the present invention can be disposed throughout one layer of material, either distributed within defined domains within the layer or distributed throughout the entire layer of material. In this state, in which the average separation of the agent is greatest, for example, a maximum level of light transmission through the layer is seen. This level can be virtually 100% transmission of light, or any value less than that, as is desired for the particular application. For example, some applications for which an observable tint is desirable at all times can transmit less than 100% of light when the agent is at maximum average separation. Application of an electric field to the agents of this example will cause the agents to absorb, scatter, or reflect more light than in the state immediately preceding application of the electric field. This effect can be caused by, for example, a change in average separation of the agents that are bound together by polymer molecules (tethered agents), or an electrophoretic migration of the agents, which can cause a change in light transmission as a result of agglomeration or change in average separation distance of the agents, as is seen with some colloidal agents, or alignment of the agents, as is seen with anisometric particles, among others.

As used herein throughout, except in specific embodiments specifically defined to be different, references to transmission of light, reflection of light, absorption of light, or scattering of light refer to light in the visible spectrum. Various embodiments of the present invention include agents that affect light transmission outside of the visible range, however, specifically the near infra red range, and such embodiments are within the scope of the invention.

In various embodiments of the present invention, the reduction in light transmission can be reversed by reversing the polarity of the applied electric field, which causes the agents of the present invention to resume their original state. In other embodiments of the present invention, a reduction in light transmission occurs as a single, irreversible step. These embodiments are useful for products for which a reversible change is not desirable. For example, an irreversible change from a transparent to an opaque glass product could be useful if used to make a product useless after a theft occurs. In other embodiments the tinting is only partially reversible, which again is useful as an anti-theft device.

As described above, the agents of the present invention can be disposed within defined domains, which are themselves disposed within a layer, binder, or other appropriate medium. Alternatively, the agents can be dispersed throughout a layer, binder or other appropriate medium without using defined domains.

As used herein, a "domain" can be any region that specifically restricts the free movement of an agent to the outside of that region. In various embodiments of the present invention, the domain is a microcapsule or a multiphase system where a discontinuous phase is contained within a continuous polymer phase. The discontinuous phase contains the agent dispersion.

FIG. 1 represents a schematic drawing of a cross section of a spherical microcapsule domain generally at 10. As shown in FIG. 1, a coating 12 surrounds a suspending material 14 in which an agent 16 is distributed. In various embodiments of the present invention, the coating 12 is a polymeric coating. In various embodiments of the present invention, the suspending material 14 is a dielectric material. In various embodiments of the present invention, the suspending material 14 is a fluid. In other embodiments, the suspending material 14 can be a gel or a solid.

The microcapsule 10 is shown disposed between a first electrode 18 and a second electrode 20. The charges shown are nominal, and can be reversed by reversing the polarity of the voltage source. The distribution of the agent 16 in FIG. 1 represents a state of maximum average separation of the agent 16. As shown in this example, no electric field has been generated, and so the agent 16 has not undergone any electrophoretically induced movement. In this state, maximum light transmission through the microcapsule 10 is observed.

Figure 2:
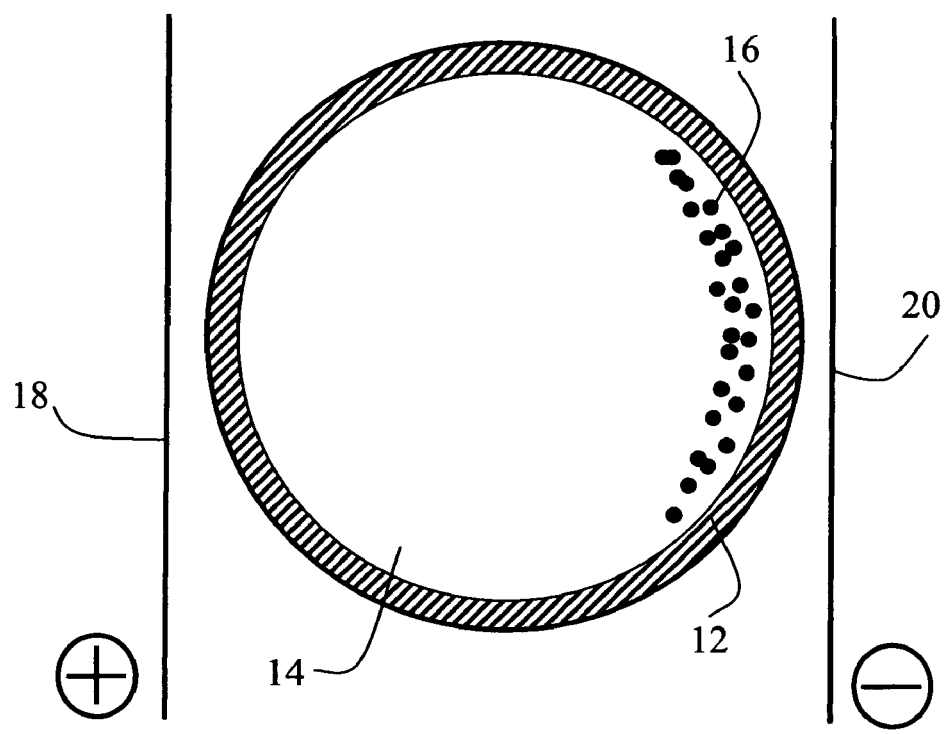
FIG. 2 represents the schematic illustration shown in FIG. 1 after application of a voltage source between the two electrodes.

FIG. 2 represents a schematic illustration of the microcapsule 10 shown in FIG. 1 after generation of an electric field by applying a voltage to the first electrode 18 and the second electrode 20. In this example, the positively charged agent 16 has migrated toward the negative second electrode 20 and has agglomerated against the coating 12. In this agglomerated state, in the dispersed state, thereby causing a net decrease in the amount of light that can pass through the microcapsule 10. In other embodiments of the present invention, where the agent has oppositely charged nanoparticles connected or tethered together by polymer molecules, as described in more detail below, no migration of the agent 16 has to occur to effect a change in light transmission through the microcapsule 10.

Figure 3:
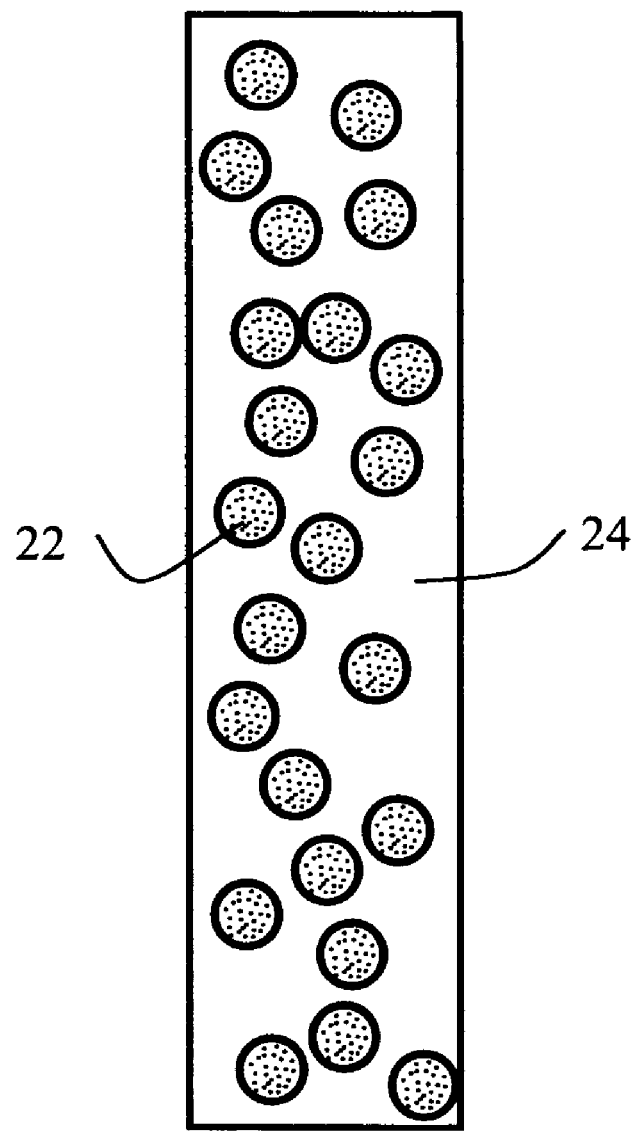
FIG. 3 represents a schematic cross section of a polymer layer having domains comprising agents of the present invention.

FIG. 3 represents a schematic cross section of a polymer layer 24 in which domains containing an agent 22 are disbursed. As with the other figures, FIG. 3 does not represent the actual size relationship between the domains 22 and the polymer layer 24. In various embodiments of the present invention, the polymer layer 24 is transparent, but, as indicated above, other embodiments entail utilization of layers and domains that are less than perfectly transparent when they are in the state of highest light transmission. As will be described in more detail below, the polymer layer 24 of these embodiments can comprise a polymer such as plasticized poly(vinyl butyral) or a similar material that is useful in laminated glass products.

As shown in FIG. 3, the present invention includes a multiple layer glass panel, comprising: a first layer comprising, a polymeric layer; and, a plurality of domains distributed throughout said polymeric layer, wherein said domains comprise an agent that causes an alteration in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer.

This polymer sheet can be used in any application in which a tintable, transparent or partially transparent polymer layer is desired.

Figure 4:
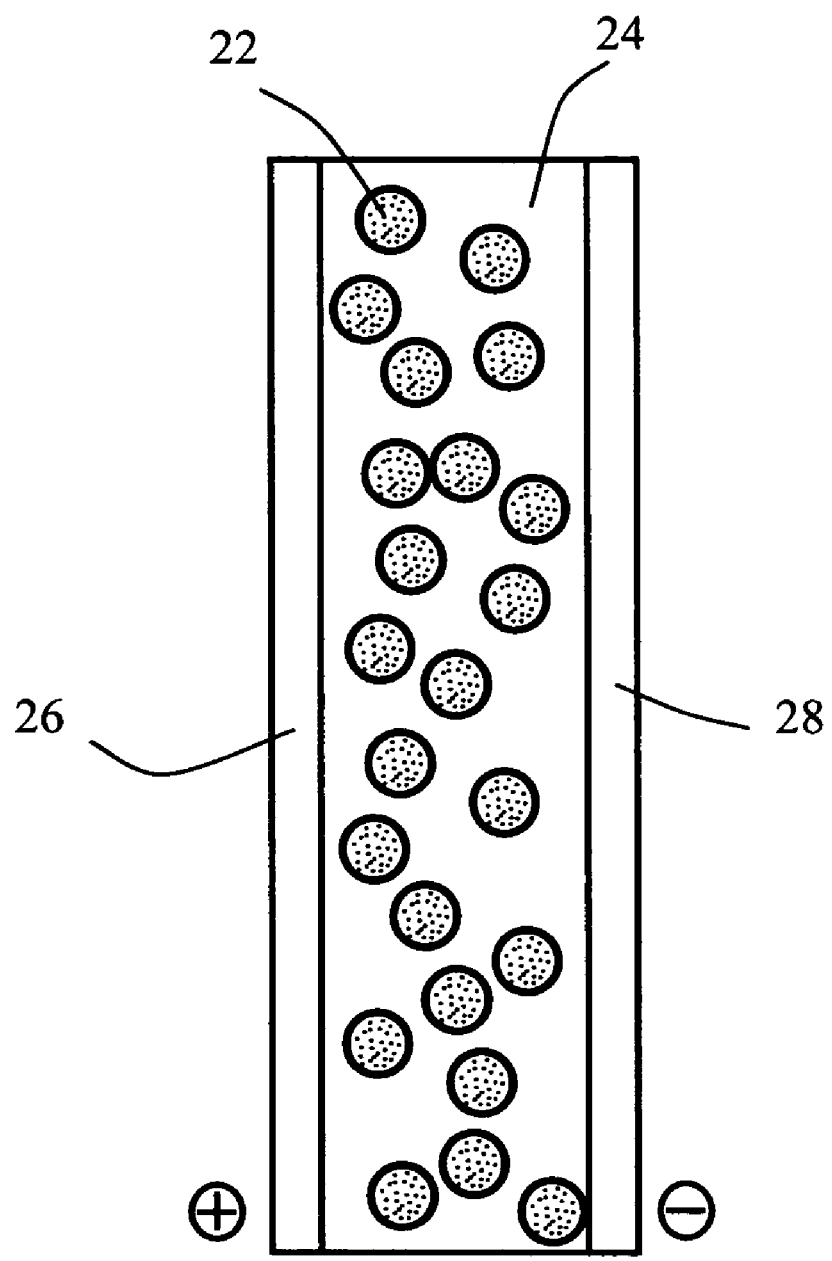
FIG. 4 represents a schematic cross section of the polymer layer shown in FIG. 3 disposed between two conductive polymeric layers.

In further embodiments, as shown in FIG. 4, in addition to the first layer, comprising a polymer layer 24 and domains 22, a second layer 26 comprising an electrically conductive polymeric sheet is disposed in contact with the first layer, and a third layer 28 also comprising an electrically conductive polymeric sheet is disposed in contact with the first layer, opposite the second layer 26. As before, charges are nominally assigned to each electrically conductive polymeric sheet, which act as electrodes when they are connected to a voltage source.

As is apparent from the configuration of the three layers shown in FIG. 4, attaching the second layer 26 and the third layer 28 to a voltage source, either AC or DC, will result in the generation of an electric field between the second layer 26 and the third layer 28. Upon generation of the electric field, the agent disposed within the domains 22 will either migrate or assume a different state, and light transmission through the three layers will be altered. In various embodiments of the present invention, the polymer layer 24, the second layer 26, and the third layer 28 can be composed of transparent materials, resulting in a multiple layer product that is transparent prior to the application of an electric field.

Figure 5:
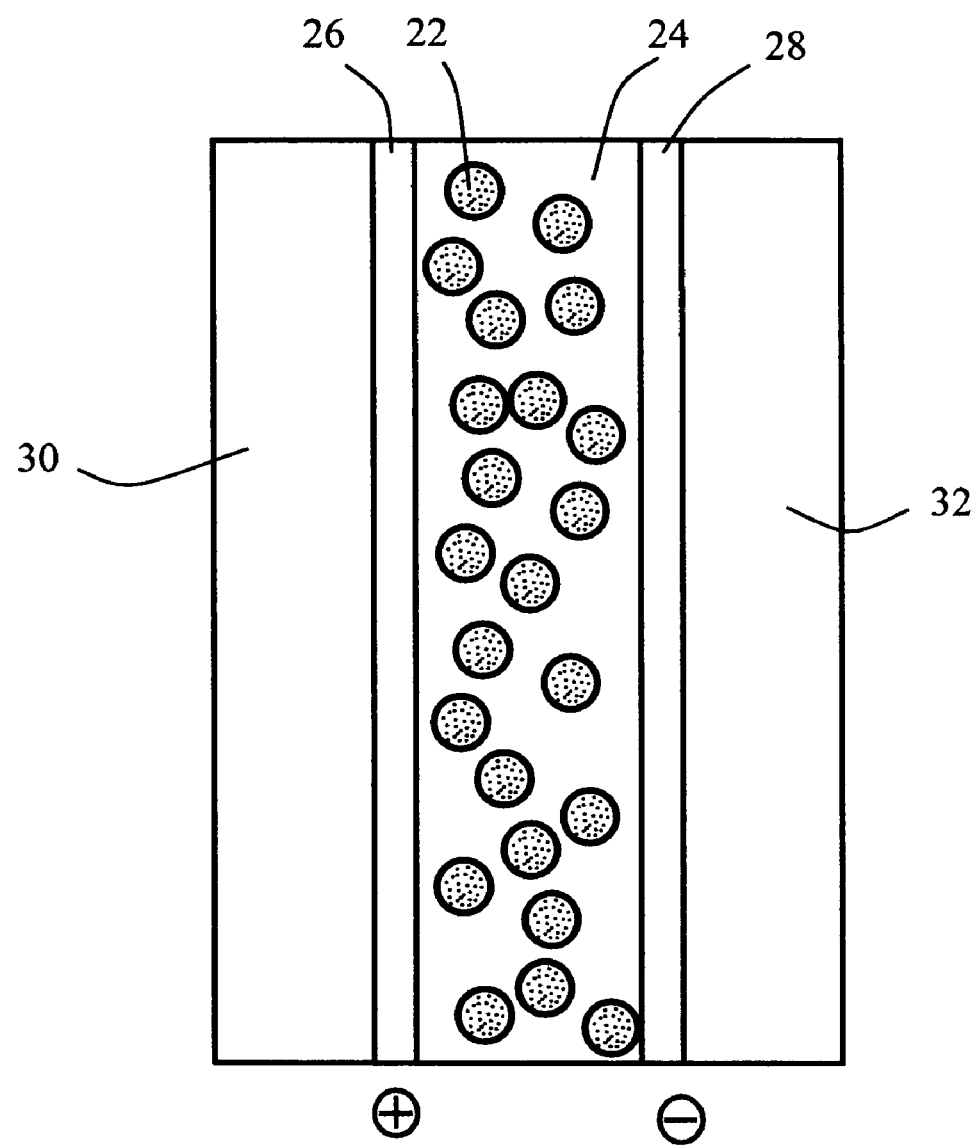
FIG. 5 represents a schematic cross section of various embodiments of the present invention in which polymer layers are added.
Figure 6:
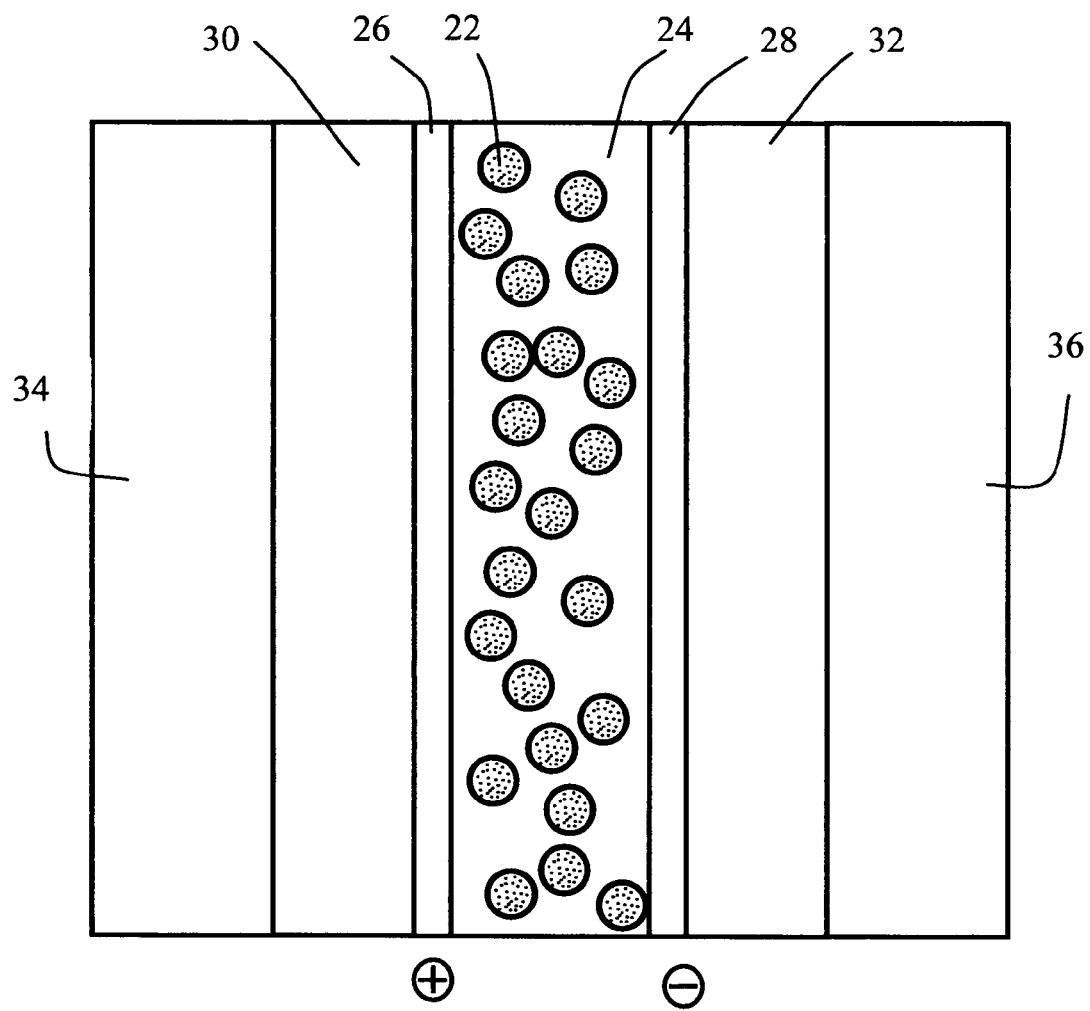
FIG. 6 represents embodiments of the present invention in which multiple layers of polymeric materials are disposed between two layers of glass in a glass panel.

As is discussed in more detail below, the second layer 26 and the third layer 28 can comprise a polymeric material such as polyethylene terephthalate that has been coated or treated so as to render the layer electrically conductive. In various embodiments of the present invention, the polymer layer 24 comprises poly(vinyl butyral) and both the second layer 26 and the third layer 28 comprise polyethylene terephthalate that has been treated with a conductive material, such as a metallic coating, indium tin oxide coating, or antimony tin oxide coating. The basic three layer construct shown in FIG. 4 can be used, as appropriate, in any suitable application, and various other layers of polymer, such as poly(vinyl butyral), and glass can be laminated onto the construct shown in order to produce a finished glass product. Examples of multiple layer constructs that utilize the three layer construct shown in FIG. 4 include those shown in FIGS. 5 and 6. In FIG. 5, a fourth layer 30 and fifth layer of a poly(vinyl butyral) type material are shown disposed in contact with the second layer 26 and the third layer 28, respectively. In FIG. 6, two layers of glass 34, 36 are shown disposed in contact with the fourth layer 30 and fifth layer 32, respectively. FIG. 6 represents a schematic cross section of a multiple layer glass panel that can be tinted by applying a voltage to the second layer 26 and the third 28. In various embodiments, all of the layers can comprise materials that are transparent, which results in a glass panel that is transparent until a voltage is applied, at which point the first layer comprising the polymer layer 24 and the domains with agents 22 will become less transparent, resulting in a tinting of the multiple layer glass panel.

The embodiments shown in FIGS. 3 through 6 are, or course, exemplary, and various substitutions of materials and layers can be used without departing from the spirit or scope of the invention. For example, many permutations of the multiple layer glass panel shown in FIG. 6 can be arrived at by adding one or more layers of a poly(vinyl butyral) type material in which one or more additives, such as, for example and without limitation, pigments, dyes, flame retardants, IR absorbers, and the like have been optionally incorporated. Further, any variations in materials or other modifications or additives that are known in the art and are compatible with the tintable components are included in embodiments of the present invention.

Figure 7:
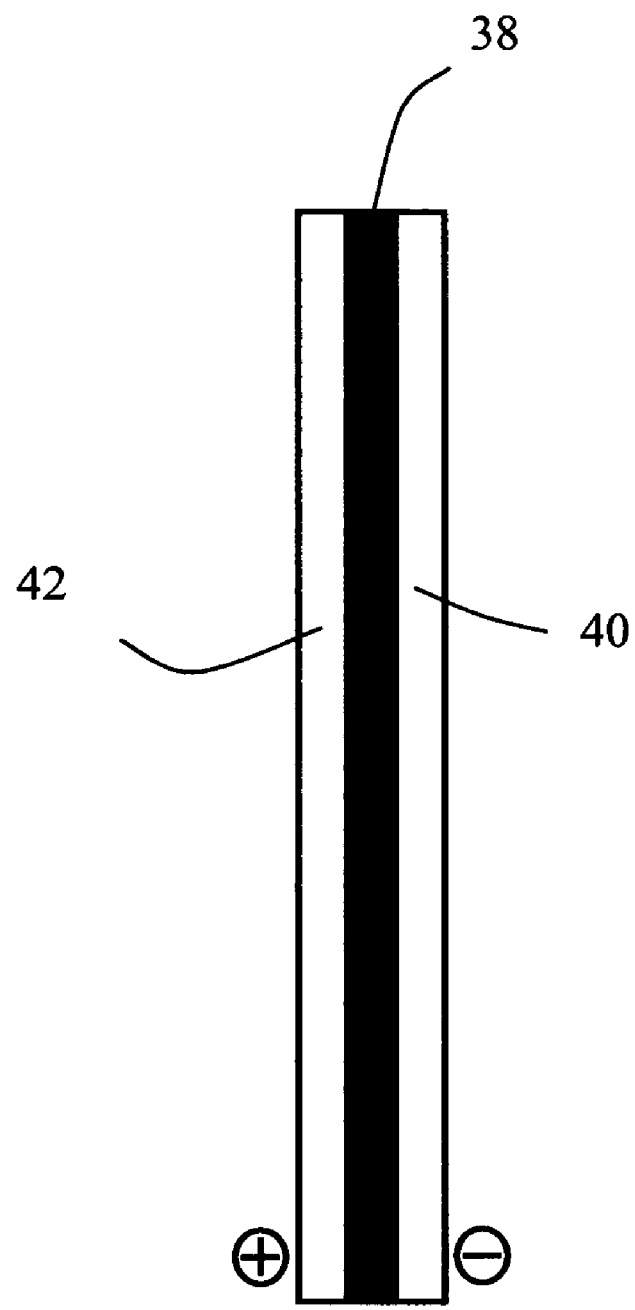
FIG. 7 represents a schematic cross section of various embodiments of the present invention employing a binder.

FIG. 7 represents a schematic cross section of other embodiments of the present invention. In this embodiment, a first layer 40 comprising an electrically conductive polymer sheet and a second layer 42 comprising an electrically conductive polymer sheet are bonded together by a binder 38, which can be any of a number of compositions, as is described in detail below. The binder 38 can comprise domains containing agents, as described above, and can also have agents distributed throughout rather than located in discrete domains. The first layer 40 and the second layer 42 can comprise any material as indicated above for layers 26 and 28, and serve the same function as given above for those layers. This arrangement of layer//binder//layer can be substituted for any permutation given above that includes the construct shown in FIG. 4.

In various embodiments of the construct shown in FIG. 7, the first layer 40 and the second layer 42 can be coated on the surface in contact with the binder 38 with a latex of polystyrene, silica, or other particle type upon which a freely distributed agent could agglomerate upon application of an electric field.

In other embodiments of the present invention, any of the polymer layers or binders described herein having the agents of the present invention can be incorporated between two layers of glass having an electrically conductive coating to form a three layer construct having the configuration: glass layer with electrically conductive coating//polymer layer or binder with agents//glass layer with electrically conductive coating. The glass layers can have different thicknesses and different electrical coatings. In these embodiments, no electrically conductive polyethylene terephthalate layers are required. This coating can be applied to either side of each glass layer, and in various embodiments the coating is disposed on the surface of the glass facing the binder or polymer layer. The electrically conductive coating can be any suitable coating, including, but not limited to indium tin oxide, antimony tin oxide, indium zinc oxide, or other metallic coatings.

In a specific embodiment, the present invention includes a multiple layer glass panel comprising: a first glass layer having an electrically conductive coating; a second glass layer having an electrically conductive coating; a polymeric layer disposed between said first glass layer and said second glass layer; and, a plurality of domains distributed throughout said polymeric layer, wherein said domains comprise an agent that causes an alteration in the amount of visible light that can be transmitted through said polymer layer response to the application of an electric field to said polymer layer.

In another embodiment, the present invention includes a multiple layer glass panel, comprising: a first glass layer having an electrically conductive coating; a second glass layer having an electrically conductive coating; wherein said first glass layer and said second glass layer are bonded together by a binder comprising a plurality of domains distributed throughout said binder, wherein said domains comprise an agent that causes an alteration in the amount of visible light that can be transmitted through said glass panel in response to the application of an electric field to said binder.

In other embodiments of the present invention, a polymer layer, such as poly(vinyl butyral) or binder of the present invention can be disposed between an electrically conductive glass layer and an electrically conductive polymer sheet, such as polyethylene terephthalate to form the electric field generating portion of a laminated glass construct. One arrangement using that construct is: layer of glass//layer of poly(vinyl butyral)//layer of electrically conductive polyethylene terephthalate//layer of poly(vinyl butyral) with agents//layer of glass with electrically conductive coating.

In addition to the various embodiments of the present invention described above, alternative embodiments of the present invention employ agents that act oppositely to those described above when in an agglomerated state. That is, these alternative agents, when dispersed, permit transmission of less light than when they are in the agglomerated state. These agents can be used in any embodiment of the present invention described elsewhere herein.

Now having described, in general, exemplary embodiments of the present invention, the various components are described in detail hereinafter.

Electrophoretic Agents and Other Agents

Agents of the present invention can include any material as is known in the art that is compatible with the other components of the invention, that permits the desired transmission of light prior to application of an electric field, and that can cause a change in light transmission when subjected to an electric field (either increase or decrease). In various embodiments of the present invention, agents and agent concentrations are selected to allow the following light transmission levels when disposed in layers or binders of the present invention prior to application of an electric field: at least 50%, at least 60%, at least 70%, at least 80%, at least 90%, at least 95%, and at least 99%. In various embodiments of the present invention, upon application of an appropriate electric field, agents and agent concentrations are, when disposed in the layers or binders of the invention, selected to effect the following total reductions in transmission of light relative to the transmission prior to application of an electric field: at least 10%, at least 20%, at least 30%, at least 40%, at least 50%, at least 60%, at least 70%, at least 80%, at least 90%, at least 95%, and at least 99%. As used herein, percent "transmission" of light is measured as the fraction of the amount of light that impinges upon one side of a layer or binder comprising agents of the present invention that emerges from the opposite side of the layer or binder, multiplied by 100.

In embodiments in which an alternative agent is used (effects on light transmission are reversed in agglomerated and dispersed state), the amount of light that is not transmitted prior to the application of an electric field can be at least 50%, at least 60%, at least 70%, at least 80%, at least 90%, at least 95%, and at least 99%, and the total amount of light that can be transmitted after application of an electric field and agglomeration of the alternative agent can be at least 10%, at least 20%, at least 30%, at least 40%, at least 50%, at least 60%, at least 70%, at least 80%, at least 90%, at least 95%, and at least 99%.

Although various ranges are given above for the amount of tinting that a given embodiment produces, one of ordinary skill in the art will recognize that the concentration of the various agents of the present invention can be altered to suit many applications.

Agents of the present invention include, for example, and without limitation, insulating particles such as; titania (anatase or rutile), barium sulfate, silica, magnesium silicate, calcium carbonate, semiconductor particles such as indium tin oxide, antimony tin oxide, carbon black, zinc oxide, lanthanum hexaboride, and conductive particles such as gold, silver, copper, platinum, palladium, and alloys.

Agents of the present invention can include, for example and without limitation, titanium dioxide, silica, zinc oxide, clays, magnesium silicate, gold, silver, indium tin oxide, antimony tin oxide, and lanthanum hexaboride.

Generally, agents can include substances that have net charges and will migrate when subjected to an electric field, and substances that have no net charge or insufficient net charge and do not migrate when subjected to an electric field.

Any agents that have a net charge and that fulfill the criteria given above at the beginning of this section can be used with the present invention. In various embodiments of the present invention, the agent used is a charged nanoparticle. Examples of nanoparticles that can be used with the present invention include noble metals, such as gold and silver, insulating metal oxides such as titanium dioxide and silica, semiconductors such as indium tin oxide, antimony tin oxide, and lanthanum hexaboride, and other charged nanoparticles known in the art. The use of very small gold or silver nanoparticles with diameters <5 μm, are particularly useful because, in a dispersed state, they have no strong resonance absorption bands and so have high light transmittance (see, for example, Templeton, *J. Phys. Chem.* 104:565 (2000), and Kreibig and Genzel, *Sur. Sci.,* 156:681 (1985)). When agglomerated on a surface, however, a reduction in transmission can occur because of the appearance of a resonance absorption band at about 530 nm wavelength. In another embodiment of this invention film arrays of larger gold nanoparticles (15 nm in diameter) have absorption peaks that vary in wavelength as a function of particle spacing. For dispersed non-interacting nanoparticles the absorption peak occurs around 530 nm where as for closely spaced particles (0.5 nm separation) the absorption peak is redshifted to 690 nm wavelength. The shift in peak absorption results in a color change and a change in visible transmittance (see, for example, Liz-Marzan and Mulvaney, J. Phys. Chem. B. 107:7312–26 (2003); Mulvaney, *Mater. Chem.* 10:1265–1266(2000); Kim, *Mat Res. Soc. Symp. Proc.* 676:Y6.1.1 (2001)). Further, gold nanoparticles have been reported to form agglomerations after subjected to an electric field, and those agglomerations have been reported to not be irreversible (see, for example, Giersig and Mulvaney, Langmuir 9:3408–13 (1993)). The changes in transmission of many different metal nanoparticles on going from a dispersed state to an agglomerated state are summarized in by Uwe Kreibig and Michael Vollmer (Optical Properties of Metal Clusters, Appendix 2 (Springer, Berlin, 1995).

In various embodiments of the present invention, nanoparticle agents are less than 200 nanometers, 175, 150, 125, 100, 75, 50, 25, 20, 15, 10, 9, 8, 7, 6, or 5 nanometers in size. In various embodiments, the agent particles are less than 100 nm in diameter, less than 50 nm in diameter, and for some embodiments, less than 5 nm in diameter.

In various embodiments of the present invention, an agent is selected from the group consisting of anatase titania, rutile titania, barium sulfate, silica, magnesium silicate, calcium carbonate, indium tin oxide, antimony tin oxide, carbon black, zinc oxide, lanthanum hexaboride, gold, silver, copper, platinum, palladium, and alloys of the foregoing. In various embodiments, the agent is selected from the group consisting of titania, silica, carbon black, gold, and silver.

Agents may be coated with polymers or silica to serve as steric stabilizers and to control particle spacing in the agglomerated state. The use of steric stabilizers in non-aqueous dispersions is well know in colloid chemistry.

Agents that result in an increase in light when shifted from an agglomerated state to a dispersed state include, without limitation, gold and silver nanoparticles whose diameters are about 5 nm (see, for example, Liz-Marzan and Mulvaney, *J. Phys. Chem. B* 107:7319 (2003) and Kreibig and Genzel, *Surface Science*, 156:694 (1985)). Agents of this type can be as large as around 100 nm or, depending on the agent, the particle size that gives rise to excessive haze, which depends on both the particle size and the difference in refractive index of the particle and medium in which it is dispersed.

Other charged agents that can be used with the present invention include anisometric agents. These agents can migrate and form agglomerations in which the particles or molecules tend to orient against a boundary against migration (such as the inner wall of a microcapsule coating or an adjoining layer) in a manner that causes greater light scattering, absorption, or reflection compared to that caused by the particles or molecules in a dispersed state. A formal charge can be imparted on these molecules by, for example, adding a charge control agent in the suspending material. These particles can have sufficient steric and electrostatic stabilization in embodiments in which irreversible agglomeration is undesirable. Anisometric agents that can be used include, without limitation, polyiodide crystals, cholesteric liquid crystals, gold or silver particles, and silica platelettes.

Bridging or tethering agents can also be used if they possess the desired characteristics. These agents do not possess an overall charge or an overall charge that is sufficient to cause mobility, but can be used because they undergo a conformational change when subjected to an electric field. The conformation change results in a greater amount of light absorption, scattering, or reflection. Bridging agents include, without limitation, polythiophene (see, for example, U.S. Patent Application 2003/0096113 A1).

In various embodiments of the present invention, more than one agent can be used in any given application to achieve the desired result.

Charge Control Agents and Particle Stabilizers

As is known in the art, charge control agents can be employed to affect the mobility of the agents used. Examples of such agents include those given in international publication WO 99/10767 and U.S. Pat. No. 6,120,839s.

Charge control agents can be used to provide good electrophoretic mobility to the above-described electrophoretic agents of the invention. Stabilizers can be used to prevent agglomeration of the electrophoretic agents, as well as to prevent the electrophoretic agents from irreversibly depositing onto the capsule wall.

Either component can be constructed from materials across a wide range of molecular weights (low molecular weight, oligomeric, or polymeric), and may be pure or a mixture. In particular, suitable charge control agents can be adapted from the liquid toner art. The charge control agent used to modify and/or stabilize the particle surface charge is applied as generally known for liquid toners, electrophoretic displays, non-aqueous paint dispersions, and engine-oil additives. For all of these, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification. An optional charge director may be used.

Charge adjuvants may also be added. These materials increase the effectiveness of the charge control agents or charge directors. The charge adjuvant may be a polyhydroxy compound or an aminoalcohol compound, which can be preferably soluble in the suspending material in an amount of at least 2% by weight. Examples of polyhydroxy compounds which contain at least two hydroxyl groups include, but are not limited to, ethylene glycol, 2,4,7,9-tetramethyl-decyne-4,7-diol, poly(propylene glycol), pentaethylene glycol, tripropylene glycol, triethylene glycol, glycerol, pentaerytlritol, glycerol-tris-12 hydroxystearate, propylene glycerol monohydroxystearate, and ethylene glycol monohydroxystearats. Examples of aminoalcohol compounds which contain at least one alcohol function and one amine function in the same molecule include, but are not limited to, triisopropanolamine, triethanolamine, ethanolamnine, 3-amino-1-propanol, o-aminophenol, 5-amino-1-pentanol, and tetrakis(2-hydroxyehtyl)ethylene-diamine. The charge adjuvant is preferably present in the suspending material in an amount of about 1 to about 100 mg/g of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning.RTM. Z-6070, Z-6124, and 3 additive, Midland, Mich.); organic titanates and zirconates (Tyzor.RTM. TOT, TBT, and TE Series, E. I. du Pont de Nemours and Company, Wilmington, Del.); hydrophobing agents, such as long chain (C12 to C50) alkyl and alkyl benzene sulphonic acids, fatty amines or diamines and their salts or quarternary derivatives; and amphipathic polymers which can be covalently bonded to the particle surface.

In general, it is believed that charging results as an acid-base reaction between some moiety present in the continuous phase and the particle surface. Thus, useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethyl hexyl) sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulphate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, and zinc naphthenate, Mn— and Zn— heptanoate, and Ba—, Al—, Co—, Mn—, and Zn— Octanoate. Useful block or comb copolymers include, but are not limited to, AB diblock copolymers of (A) polymers of 2-(N,N)-dimethylaminoethyl methacrylate quaternized with methyl-p-toluenesulfonate and (B) poly-2-ethylhexyl methacrylate, and comb graft copolymers with oil soluble tails of poly(12-hydroxystearic acid) and having a molecular weight of about 1800, pendant on an oil-soluble anchor group of poly (methyl methacrylate-methacrylic acid). Useful organic amides include, but are not limited to, polyisobutylene succinimides such as OLOA 1200, and N-vinyl pyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to capsule walls. For the typical high resistivity liquids used as suspending fluids in electrophoretic displays, nonaqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

Suspending Material

The suspending material (item 14 in FIG. 1) of the present invention can be any material known in the art that is compatible with the agents and microcapsule coatings of the present invention, and can be, for example, a dielectric liquid. Embodiments in which migration of the agent is not essential for tinting can comprise suspending material that is not a fluid.

In various embodiments the suspending material can be a high electrical resistivity, low dielectric constant fluid. It can be a halogenated hydrocarbon such as tetrachloroethylene or a low molecular weight polymer such as poly(chlorotrifluoro ethylene) or a perfluorinated polyether. The suspending fluid may be a hydrocarbon or an acyclic monocarboxylic acid ester such as triethylene glycol bis(2-ethylhexanoate) or mixture of triethylene glycol bis(2-ethylhexanoate) and triethylene glycol (2-ethyl hexanoate).

In various embodiments the suspending material can be low molecular weight poly(chlorotrifluoroethylene), perfluorinated polyether, aliphatic hydrocarbons, triethylene glycol bis(2-ethyl hexanoate), or a mixture of triethylene glycol (2-ethyl hexanoate) and triethylene glycol bis(2-ethyl hexanoate).

For embodiments in which the suspending material is a fluid, the suspending fluid can be chosen based on properties such as density, refractive index, and solubility. A preferred suspending fluid has a low dielectric constant (for example, about 2), high volume resistivity (for example, about 10 15 ohm-cm), low viscosity (for example, less than 5 cst), low toxicity, and environmental impact, low water solubility (for example, less than 10 ppm), high specific gravity (for example, greater than 1.5), a high boiling point (for example, greater than 90 degrees Celsius), and a low refractive index (for example, less than 1.2).

The choice of suspending fluid may be based on concerns of chemical inertness, density matching to the agent used, or chemical compatibility with both the agent and microcapsule coating. The viscosity of the fluid generally should be low to facilitate agent movement. The refractive index of the suspending fluid may also be substantially matched to that of the agent. As used herein, the refractive index of a suspending fluid "is substantially matched" to that of an agent if the difference between their respective refractive indices is between zero and 0.3. In various embodiments this difference is between 0.05 and 0.2.

Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, can be a blend of more than one fluid in order to tune its chemical and physical properties. Furthermore, the fluid may contain surface modifiers to modify the surface energy or charge of the electrophoretic agent or microcapsule coating. Reactants or solvents used in the microencapsulation process (oil soluble monomers, for example) can also be contained in the suspending fluid. Charge control agents can also be added to the suspending fluid.

Useful organic solvents include, but are not limited to, epoxides, such as, for example, decane epoxide and dodecane epoxide; vinyl ethers, such as, for example, cyclohexyl vinyl ether and Decave™. (International Flavors & Fragrances, Inc., New York, N.Y.); and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, and carbon tetrachloride.

Useful hydrocarbons include, but are not limited to, dodecane, tetradecane, the aliphatic hydrocarbons in the Isopar™. series (Exxon, Houston, Tex.), Norpar™ (series of normal paraffinic liquids), Shell-Solo™ (Shell, Houston, Tex.), and Sol-Trol™ (Shell), naphtha, and other petroleum solvents.

Useful examples of silicone oils include, but are not limited to, octamethyl cyclosiloxane and higher molecular weight cyclic siloxanes, poly(methyl phenyl siloxane), hexamethyldisiloxane, and polydimethylsiloxane.

Useful low molecular weight halogen-containing polymers include, but are not limited to, poly(chlorotrifluoroethylene) polymer (Halogenated hydrocarbon Inc., River Edge, N.J.), Galdene™ (a perfluorinated ether from Ausimont, Morristown, N.J.), or Krytox™ from E. I. du Pont de Nemours and Company (Wilmington, Del.). In one embodiment, the suspending fluid is a poly(chlorotrifluoroethylene) polymer. In various embodiments, this polymer has a degree of polymerization from 2 to 10. Many of the above materials are available in a range of viscosities, densities, and boiling points.

It is desirable to be able to form the fluid into small droplets prior to a capsule being formed. Processes for forming small droplets include flow-through jets, membranes, nozzles, or orifices, as well as shear-based emulsifying schemes, as are well known in the art. The formation of small drops may be assisted by electrical or sonic fields. Surfactants and polymers can be used to aid in the stabilization and emulsification of the droplets in the case of an emulsion type encapsulation. A surfactant for use in displays of the invention is sodium dodecylsulfate.

Microcapsule Coatings and Formation Techniques

Microcapsules of the present invention can be formed by any method known in the art, and can comprise any coating (item 12 in FIG. 1) that is appropriate for the application (see, for example, U.S. Pat. Nos. 6,120,588 and 6,045,955; WO 00/20921; WO 99/10767; and, Comiskey et al. *Nature* 394:253–55 (1998)). In various embodiments of the present invention, the microcapsule coating is a polymeric coating comprising a member selected from the group consisting of poly(vinyl butyral), gelatin, polyvinyl alcohol, cellulosic dierivatives, aciacia, carageenan, hydroxylate stryrene anhydride copolymers, methyl vinyl ether co-maleic anhydride, polyvinyl pyridine, polyacrylonitrile, polystyrene, poly(methyl methacrylate), poly(butyl methacrylate), polyhydroxy amide with aldehyde, melamine formaldehyde, urea formaldehyde, water soluble oligomers of the condensate of melamine, water soluble oligomers of urea, water soluble oligomers of formaldehyde, and vinyl monomers such as, styrene, methyl methacrylate, acrylonitrile, diacyl chloride, vinyl acetate, acrylic acid, butyl acrylate, and t-butyl acrylate (see, for example, PCT/US98/17734).

Encapsulation of the suspending material, specifically suspending liquids, with one or more dispersed agents may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Nuyes Data Corp., Park Ridge, N.J. (1976). The processes fall into several general categories, all of which can be applied to the present invention: interfacial polymerization, in situ polymerization, physical processes, such as extrusion, compounding using a twin screw extruder and other phase separation processes, in-liquid curing, and simple/complex coacervation.

Numerous materials and processes are useful in formulating polymer sheets useful in adjustable tint panels of the present invention. Useful materials for simple coacervation processes include, but are not limited to, gelatin, polyvinyl alcohol, polyvinyl acetate, and cellulosic derivatives, such as, for example, carboxymethylcellulose. Useful materials for complex coacervation processes include, but are not limited to, gelatin, acacia, carageenan, carboxymethylcellulose, hydrolized styrene anhydride copolymers, agar, alginate, casein, albumin, methyl vinyl ether co-maleic anhydride, and cellulose phthalate. Useful materials for phase separation processes include, but are not limited to, polystyrene, PMMA, polyethyl methacrylate, polybutyl methacrylate, ethyl cellulose, polyvinyl pyridine, and poly acrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, MMA and acrylonitrile. Finally, useful materials for interfacial polymerization processes include, but are not limited to, diacyl chlorides, such as, for example, sebacoyl, adipoyl, and di- or poly- amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

In the context of the present invention, one skilled in the art will select an encapsulation procedure and coating material based on the desired microcapsule properties. These properties include the distribution of microcapsule radii; electrical, mechanical, diffusion, and optical properties of the capsule wall; and chemical compatibility with the suspending material.

The microcapsule coating generally has a high electrical resistivity (see, for example, U.S. Pat. No. 4,605,284). The coating should also be mechanically strong (although if the finished microcapsule powder is to be dispersed in a curable polymeric binder for coating, mechanical strength is not as critical).

The microcapsule coating can be porous in some applications, and these can be overcoated in a postprocessing step (i.e., a second encapsulation). Moreover, if the microcapsules are to be dispersed in a curable binder, the binder can serve to close the pores. The microcapsule coating can, in various embodiments, be optically clear. The coating material may, however, be chosen to match the refractive index of the suspending material or a binder of the polymer layer in which the microcapsules are to be dispersed. For some applications (e.g., interposition between two fixed electrodes), monodispersed microcapsule radii are desirable.

An encapsulation technique that can be used with the present invention is set forth in U.S. Pat. No. 4,087,376. The procedure involves a polymerization between urea and formaldehyde in an aqueous phase of an oil/water emulsion in the presence of a negatively charged, carboxyl-substituted, linear hydrocarbon polyelectrolyte material. The resulting microcapsule coating is a urea/formaldehyde copolymer. The microcapsule is clear, mechanically strong, and has good resistivity properties.

The related technique of in situ polymerization utilizes an oil/water emulsion, which is formed by dispersing the suspending material and the agent in an aqueous environment. The monomers polymerize to form a polymer with higher affinity for the internal phase than for the aqueous phase, thus condensing around the emulsified oily droplets. In one in situ polymerization processes, urea and formaldehyde condense in the presence of poly(acrylic acid) (See, e.g., U.S. Pat. No. 4,001,140). In another useful process, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and poly isocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach uses the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets.

Other techniques and materials known in the art can also be used.

Binder

For embodiments utilizing the construct shown in FIG. 7, the binder 38 can comprise any suitable material. In various embodiments, the binder is used as a non-conducting, adhesive medium supporting and protecting the microcapsules or the agents directly, as well as binding the electrode layers to the microcapsule dispersion. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methyl pyrolidone, N-vinyl pyrolidone, the various Carbowax.RTM. species (Union Carbide, Danbury, Conn.), and poly-2-hydroxyethylacrylate.

The water-dispersed or water-borne systems are generally latex compositions, typified by the Neore™ and Neocryl™ resins (Zeneca Resins, Wilmington, Mass.), Acrysol™ (Rohm and Haas, Philadelphia, Pa.), Bayhydrol™ (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a crosslinking reagent, such as an aziridine, for example, which reacts with carboxyl groups.

An example of a water-borne resin and aqueous microcapsules follows:

A volume of microcapsules is centrifuged at low speed to separate excess water. After a given centrifugation process, for example 10 minutes at 60 times gravity, the microcapsules are found at the bottom of the centrifuge tube, while the water portion is at the top. The water portion is carefully removed (by decanting or pipetting). The mass of the remaining microcapsules is measured, and a mass of resin of binder is added such that the mass of resin is between one eighth and one tenth of the mass of the microcapsules. This mixture is gently mixed on an oscillating mixer for approximately one half hour. After about one half hour, the mixture is ready to be coated onto the appropriate substrate, for example, a polyethylene terephthalate film. Of course any of the above mentioned binders can be used in any suitable combination with the microcapsules of the present invention.

Another example of binders that can be used are the epoxies. These binary systems can vary greatly in viscosity, and the reactivity of the pair determines the "pot life" of the mixture. If the pot life is long enough to allow a coating operation, microcapsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant microcapsules could be coated in such a medium. The solidification process begins during cooling, and the final hardness, clarity and flexibility are affected by the branching and molecular weight of the polymer.

Radiation cure resins are generally found among the solvent-based systems. Microcapsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and crosslinkers.

A number of "water-reducible" monomers and oligomers are available. Water is used in these cases to reduce the viscosity (initially from thousands to hundreds of thousands centipoise). Water-based microcapsules, such as those made from a protein or polysaccharide material, for example, could be dispersed in such a medium and coated. Curing in such systems is generally by ultraviolet radiation.

In various embodiments the binder is selected from the group consisting of water-soluble polymers, water-borne polymers, oil-soluble polymers, thermoset polymers, thermoplastic polymers, and radiation-cured polymers.

Polymer Layer

The polymer layer 24 shown in FIG. 3 is described in this section, and is generally useful as an interlayer in safety glass applications. The polymer layer can comprise any suitable polymer, and, in a preferred embodiment, as exemplified above, the polymer layer comprises poly(vinyl butyral). In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives disclosed herein can be used with the polymer layer having a polymer consisting of or consisting essentially of poly(vinyl butyral).

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and optionally other additives.

In one embodiment, the polymer layer comprises a polymer based on partially acetalized poly(vinyl alcohol)s. In another embodiment, the polymer layer comprises a polymer selected from the group consisting of poly(vinyl butyral), polyurethane, polyvinyl chloride, poly(ethylene vinyl acetate), combinations thereof, and the like. In one embodiment, the polymer layer comprises poly(vinyl butyral). In other embodiments, the polymer layer comprises plasticized poly(vinyl butyral). In further embodiments the polymer layer comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer layers.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin.

In various embodiments, the polymer layer comprising poly(vinyl butyral) comprises 10 to 35 weight percent (wt. %) hydroxyl groups calculated as PVOH, 13 to 30 wt. % hydroxyl groups calculated as PVOH, or 15 to 22 wt. % hydroxyl groups calculated as PVOH. The polymer layer can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer layer comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight. Any suitable method can be used to produce the polymer layers of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381–399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments of polymer layers of the present invention, the polymer layers can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) layer. In general, higher amounts of plasticizer are added to decrease the $T_g$. Poly(vinyl butyral) polymer layers of the present invention can have a $T_g$ of 40° C. or less, 35° C. or less, 30° C. or less, 25° C. or less, 20° C. or less, and 15° C. or less.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate.

Adhesion control agents can also be include in the polymer layers of the present invention to impart the desired adhesiveness. For example, any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer layers of the present invention comprise, in addition to sodium acetate, magnesium bis(2-ethyl butyrate)(chemical abstracts number 79992-76-0). The magnesium salt can be included in an amount effective to control adhesion of the polymer layer to glass.

Additives may be incorporated into the polymer layer to enhance its performance in a final product. Such additives include, but are not limited to, plasticizers, dyes, pigments, stabilizers (e.g., ultraviolet stabilizers), antioxidants, flame retardants, IR absorbers, combinations of the foregoing additives, and the like, as are known in the art.

Agents that selectively absorb light in the visible or near infrared spectrum can be added to any of the appropriate polymer layers. Agents that can be used include dyes, pigments, indium tin oxide, antimony tin oxide or lanthanum hexaboride.

The poly(vinyl butyral) polymer and plasticizer additives can be thermally processed and configured into sheet form according to methods known to those of ordinary skill in the art. One exemplary method of forming a poly(vinyl butyral) layer comprises extruding molten poly(vinyl butyral) comprising resin, plasticizer, and additives (hereinafter "melt") by forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet. In either embodiment, the surface texture at either or both sides of the layer may be controlled by adjusting the surfaces of the die opening or by providing texture at the roller surface. Other techniques for controlling the layer texture include varying parameters of the materials (for example, the water content of the resin and/or the plasticizer, the melt temperature, molecular weight distribution of the poly(vinyl butyral), or combinations of the foregoing parameters). Furthermore, the layer can be configured to include spaced projections that define a temporary surface irregularity to facilitate the de-airing of the layer during lamination processes after which the elevated temperatures and pressures of the laminating process cause the projections to melt into the layer, thereby resulting in a smooth finish. In various embodiments, the polymer layers can have thicknesses of 0.1 to 2.5 millimeters, 0.2 to 2.0 millimeters, 0.25 to 1.75 millimeters, and 0.3 to 1.5 millimeters (mm).

The parameters for the polymer layer described above apply as well to the fourth layer 30 and the fifth layer 32 shown in FIG. 5, as well for any layer in a multiple layer construct of the present invention that is a poly(vinyl butyral) type layer.

The microcapsules of the present invention can be readily added to the polymer layer by mixing the microcapsules into the plasticizer then melt blending with resin before formation of the layer product. Likewise, the agents of the invention can be dispersed in the polymer layer without microcapsules by adding the agents to the plasticizer then melt blending with resin prior to layer formation. The agent may also be dispersed in a medium that is not compatible with the polymer phase. In this case, when the dispersion is combined with the polymer phase it will separate into discrete spherical domains uniformly distributed throughout the polymer phase. This forms microcapsules with walls that are the polymer phase itself (see, for example, Meijer and Janssen, "Mixing of Immiscible Liquids," in *Mixing and Compounding of Polymers*, Hanser Publishers, Munich and New York (1994)).

The following paragraphs describe various techniques that can be used to improve and/or measure the characteristics of the polymer layer.

The clarity of a polymer layer, and particularly a poly (vinyl butyral) layer, can be determined by measuring the haze value, which is a quantification of light not transmitted through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corp. by methods described in international standard ISO 9050:1990.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

Electrically Conductive Polymer Sheets

Referring to FIG. 4, the second layer 26 and the third layer 28, as well as any additional layers of this type including the first layer 40 and the second layer 42 shown in FIG. 7, can comprise any suitable material that is compatible with the other layers and onto or into which a conductive material can be disposed. In various embodiments the layer comprises, consists of, or essentially consists of polyethylene terephthalate. In various embodiments the layer comprises, consists of, or essentially consists of polyethylene napthalate.

The manufacture of and the resulting characteristics of polyethylene terephthalate are well known in the art, and can be purchased, for example, as a film product produced by 3M (St. Paul, Minn.) or CPFilms (Martinsville, Va.). The polyethylene terephthalate layers can optionally comprise a copper grid, an NIR absorbing layer, or any other material or agent that is known in the art and is printed on, dispersed on, or otherwise used in conjunction with polyethylene terephthalate or an equivalent material.

In various embodiments of the present invention, electrically conductive material is deposited on a polyethylene layer (polymer sheet) using known techniques. In any of the embodiments of the present invention described herein, the conductive coating can be applied toward or away from the polymer layer or the binder. In embodiments in which no microcapsules are used and the agent is distributed throughout the polymer layer or the binder, the electrically conductive coating will generally be on the side of the polymer sheet that is not in contact with the agent containing polymer layer or binder.

In various embodiment, the electrically conductive coating is selected from the group consisting of indium tin oxide, antimony tin oxide, indium zinc oxide, and conductive polymers such as polyaniline. Other metallic coating can be used as well.

An electrical connection to an electrically conductive polymer sheet can be formed in any manner as is known in the art in order to allow for the generation of an electric field.

Function

Various embodiments of the present invention having been described above in detail, the functioning of the multiple layer constructs of the present invention will now be described.

The various constructs will generally be produced with agents disposed in a dispersed (maximum average separation) state, which results in maximum transmission of light through the layers. Upon application of a voltage to the two electrically conductive polymer sheets, an electric field is generated over the polymer layer or the binder.

This electric field results in, in most cases, an electrophoretic migration of the agent to either the edge of the suspending fluid, in embodiments where microcapsules are used, or to the edge of the polymer layer or binder in which the agent is disposed. Depending on the agent and other materials used, the agent will agglomerate, and the agglomerated agent will generally remain in an agglomerated state after removal of the voltage source and consequent elimination of the electric field. In various embodiments of the present invention, the agglomeration of the agent is a stable state. In other embodiments, the agglomeration is not stable, and a slow return to a dispersed state will occur. As will be understood by one of ordinary skill in the art, selection of agent, coating material, suspending fluid, binder, and polymer layer can all affect the stability of the agglomerated state.

Again, depending on the exact materials selected, the agglomerated state can be reversible, partially reversible, or irreversible. In various embodiments of the present invention, the agent of the present invention can be reversibly made to agglomerate and disperse indefinitely by simply alternating between electric fields of opposite polarity. After initial migration and agglomeration, a polarity reversal of the electric field will cause the agent to migrate away from the agglomerated state. By limiting the duration of the electric field, the agent can be made to stop migrating before it reaches the opposite side of the microcapsule, layer, or binder, thereby allowing a return to a non-agglomerated state. Further, by altering the duration of each electric field, and thereby altering the average separation of particles of the agent, varying degrees of light transmission between maximum and minimum are obtainable. Finally, both states in a reversible system can be stable (i.e. do not require an electric field to maintain the state), resulting in a bistable system.

Methods of the present invention include a method of reversibly reducing light transmission through an opening, comprising: providing a multiple layer glass panel in said opening, wherein said multiple layer glass panel comprises a first layer comprising, a polymeric layer; and, a plurality of domains distributed throughout said polymeric layer, wherein said domains comprise an agent that causes an alteration in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer; connecting a voltage source to said second layer and said third layer, thereby generating an electric field across said first layer; and, reversing the polarity of said voltage source to said second layer and said third layer, thereby reversing said electric field.

Methods of the present invention also include a method of reducing light transmission through an opening, comprising: providing a multiple layer glass panel in said opening, wherein said multiple layer glass panel comprises a first layer comprising, a polymeric layer; and, a plurality of domains distributed throughout said polymeric layer, wherein said domains comprise an agent that causes a reduction in the amount of visible light that can be transmitted through said first layer in response to the application of an electric field to said first layer; a second layer comprising an electrically conductive polymeric sheet disposed in contact with said first layer; and, a third layer comprising an electrically conductive polymeric sheet disposed in contact with said first layer opposite said second layer; and, connecting a voltage source to said second layer and said third layer, thereby generating an electric field across said first layer.

In various embodiments of the present invention the change in optical state in transitioning between a dispersed to a more highly agglomerated state can be; high visible transmittance clear state to a diffusely scattering high visible transmittance state, high visible transmittance state to a low visible transmittance (highly absorbing) state, low visible transmittance absorbing state to a high visible transmittance state or to a wavelength selective reflecting state based on an ordered colloidal crystal agglomerated state (Liz-Marzan and Mulvaney, *J. Phys. Chem. B*, 107:7321–7324 (2003)).

In other embodiments of the present invention, any of the agents given above, where appropriate, can be used in a construct where a dispersion of highly absorbing nanoparticles (such as gold, silver, carbon black, indium tin oxide, or lanthanum hexaboride) is pulled sideways, in line with the plane of the layer, by application of an electric field. In this embodiment the dispersed highly absorbing particles cover substantially the entire area of the sheet or laminated glazing that incorporates the sheet. Application of an electric field causes the absorbing particles to migrate sideways, thereby causing most of the area of the sheet or glazing to become transparent (See, for example, WO 99/10767).

Further, the present invention includes a laminated safety glass panel comprising any of the multiple layered constructs disclosed herein. The layers of polymer can be disposed between two layers of glass, typically comprising silicon dioxide. Further included is a laminated safety glass comprising sheets of glass with any of the multiple polymer layer constructs described herein.

The present invention also includes windshields, windows, display panels, sunglasses, security devices, and other finished glass products comprising the glass panels of the present invention.

EXAMPLE 1

Figure 8:
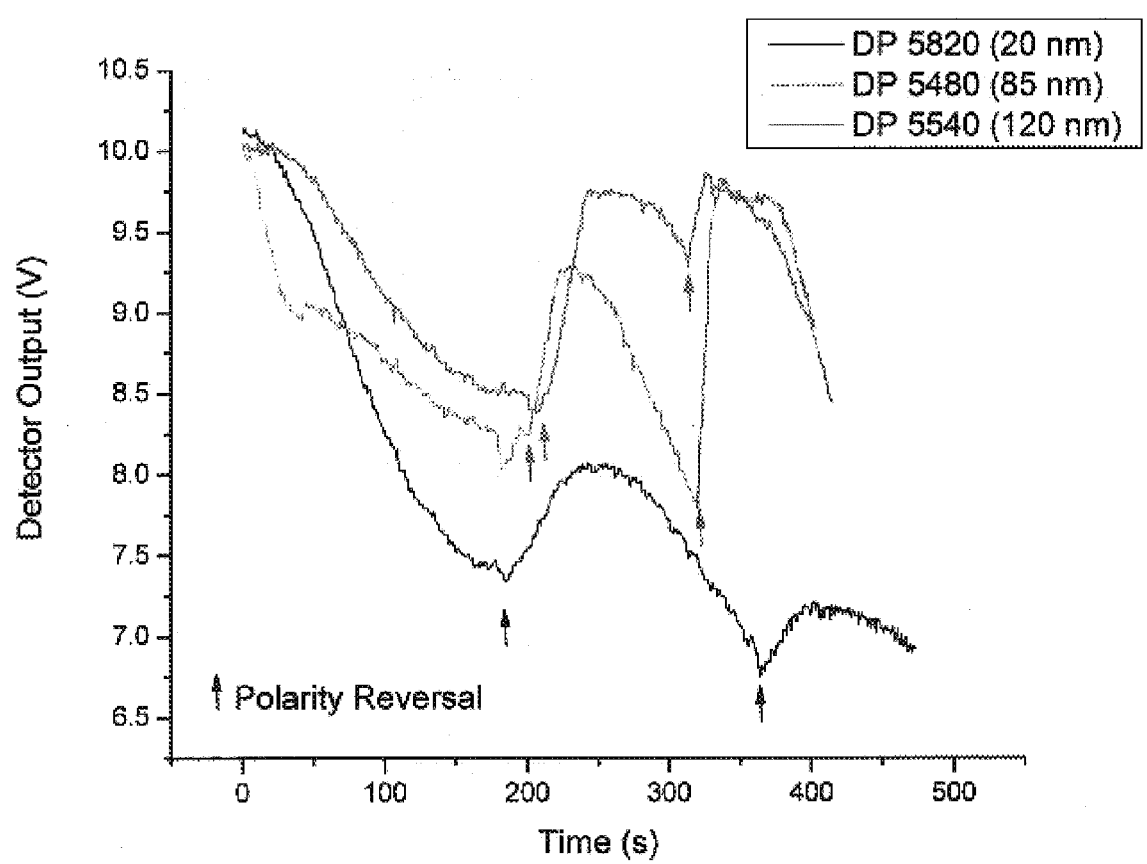
FIG. 8 represents a graph of detector voltage output versus time for three example dispersions.

An electrophoretic test cell consisting of two transparent electrically conductive pieces of polyethylene terephthalate separated by 0.2 cm using a rubber spacer is constructed. The conductive PET electrodes are supported by two pieces of glass. The electrodes are connected to a direct current power source. Samples of negatively charged silica nanoparticles dispersed in ethylene glycol are placed between the electrodes and a voltage is applied. Three dispersions, labeled DP 5820, DP 5480, and DP 5540 are used (available from Nyacol Nanotechnologies (Ashland Mass.)). Results for three different size silica particles in ethylene glycol are shown in the FIG. 8, which is a plot of light transmittance vs. time. As shown in FIG. 8, upon application of 10 volts across the electrodes, which produces an electric field of 50 volts/cm between the electrodes, there is visible electrophoretic migration and deposition of silica on the positive electrode, resulting in a decrease in light transmittance. Switching the polarity of the voltage causes the silica nanoparticles to redisperse, as indicated by the increase in light transmission, and deposit on the opposite electrode, as indicated by the decrease in light transmittance.

Figure 9A:
FIGS. 9a and 9b are scanning electron micrographs of a silica sol deposited on an indium tin oxide electrode.
Figure 9B:
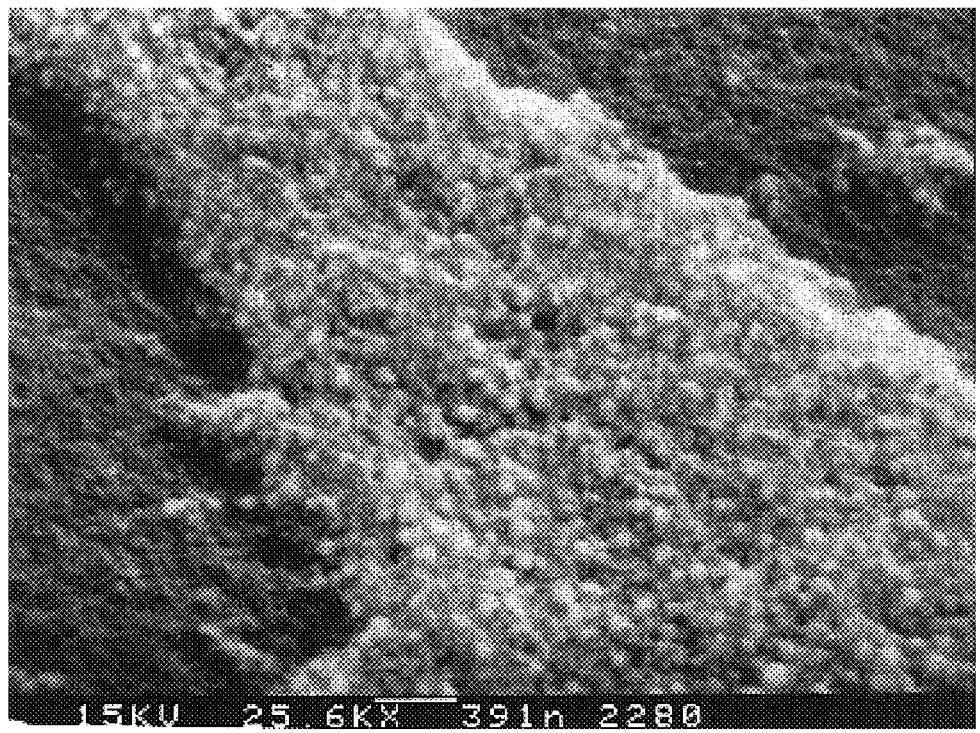

FIGS. 9*a* and 9*b* are scanning electron micrographs of silica particles from DP5820 deposited on an ITO electrode, with a nominal particle size of about 20 nm and some large agglomerates, corresponding to a low light transmission state. Increasing the applied voltage will decrease the switching time between high and low light transmission states.

It is believed that the decrease in light transmission in the agglomerated state is caused by an increase in light scattering. It is believed that the cause of the increased light scattering is the mismatch of refractive indices between ethylene glycol (1.430) and silica (1.456) coupled with the increase in scattering efficiency of large particle agglomerates relative to well dispersed individual nanoparticles.

EXAMPLE 2

A sample of negatively charged silica nanoparticles dispersed in triethylene glycol is placed between the electrodes of the electrophoretic test cell described in Example 1. Upon application of a voltage across the electrodes, no change in light transmission is observed, even after prolonged application of voltage. It is believed that the reason for no change in light transmission is the near perfect match of refractive indices of triethylene glycol (refractive index of 1.457) and silica (refractive index of 1.456). In the system of Example 1 there is a significant difference between the refractive index of silica and of ethylene glycol (1.430), so a change in light transmission because of an increase in light scattering in the agglomerated state is observed.

EXAMPLE 3

A sample of indium tin oxide nanoparticles dispersed in triethylene glycol bis(2-ethyl hexanoate) is placed between the electrodes of the electrophoretic test cell described in Example 1. Upon application of a voltage across the electrodes of the electrophoretic test cell, no change in light transmission is observed. Because of the low polarity of the triethylene glycol bis(2-ethyl hexanoate), it is believed there is insufficient charge on the indium tin oxide nanoparticles for electrophoretic migration to occur.

By virtue of the present invention, it is now possible to provide multiple layer glass panels, or laminated panels, having adjustable tinting, which allows for adjustment of light transmission for improved privacy and climate control.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, a polymer layer can be formed comprising acetate in any of the ranges given in addition to any of the ranges given for plasticizer, to form many permutations that are within the scope of the present invention.

Any figure reference numbers given within the abstract or any claims are for illustrative purposes only and should not be construed to limit the claimed invention to any one particular embodiment shown in any figure.

Each reference, including journal articles, patents, applications, and books, referred to herein is hereby incorporated by reference in its entirety.

I claim:

1. A polymer sheet comprising:
   a polymeric layer comprising poly(vinyl butyral);
   a plurality of domains distributed throughout said polymeric layer, wherein said domains are in the form of microcapsules comprising a liquid dielectric material encapsulated in a polymeric coating; and,
   an agent dispersed in said liquid dielectric material, wherein said agent causes an alteration in the amount of visible light that can be transmitted through said polymer sheet in response to the application of an electric field to said polymer sheet.

2. The polymer sheet of claim 1, wherein said polymeric coating comprises poly(vinyl butyral), gelatin, polyvinyl alcohol, cellulosic derivatives, aciacia, carageenan, hydroxylate styrene anhydride copolymers, methyl vinyl ether co-maleic anhydride copolymers, polyvinyl pyridine, polyacrylonitrile, polystyrene, poly(methyl methacrylate), poly(butyl methacrylate), polyhydroxy amide with aldehyde, melamine formaldehyde resin, urea formaldehyde resin, water soluble oligomers of the condensate of melamine, water soluble oligomers of urea, water soluble oligomers of formaldehyde, or polymers of any of the following: diacyl chloride, vinyl acetate, acrylic acid, butyl acrylate, or t-butyl acrylate.

3. The polymer sheet of claim 1, wherein said dielectric material is selected from the group consisting of a low molecular weight poly(chlorotrifluoroethylene), perfluorinated polyether, aliphatic hydrocarbons, triethylene glycol bis(2-ethyl hexanoate), and a mixture of triethylene glycol (2-ethyl hexanoate) and triethylene glycol bis(2-ethyl hexanoate).

4. The polymer sheet of claim 1, wherein said agent is selected from the group consisting of anatase titania, rutile titania, barium sulfate, silica, magnesium silicate, calcium carbonate, indium tin oxide, antimony tin oxide, carbon black, zinc oxide, lanthanum hexaboride, gold, silver, copper, platinum, palladium, and alloys of the foregoing.

5. The polymer sheet of claim 1, wherein said agent is selected from the group consisting of titania, silica, carbon black, gold, and silver.

6. The polymer sheet of claim 1, wherein said application of an electric field causes said agent to agglomerate.

7. The polymer sheet of claim 1, wherein said polymeric layer further comprises a plasticizing agent.

8. A multiple layer glass panel, comprising:
   a first layer comprising,
      a polymeric layer comprising poly(vinyl butyral);
      a plurality of domains distributed throughout said polymeric layer, wherein said domains are in the form of microcapsules comprising a liquid dielectric material encapsulated in a polymeric coating; and,
      an agent dispersed in said liquid dielectric material, wherein said agent causes an alteration in the amount of visible light that can be transmitted through said first layer in response to the application of an electric field to said first layer;
   a second layer comprising an electrically conductive polymeric sheet disposed in contact with said first layer;
   a third layer comprising an electrically conductive polymeric sheet disposed in contact with said first layer opposite said second layer; and
   at least one layer of glass.

9. The multiple layer glass panel of claim 8, wherein said polymeric coating comprises poly(vinyl butyral), gelatin, polyvinyl alcohol, cellulosic derivatives, aciacia, carageenan, hydroxylate styrene anhydride copolymers, methyl vinyl ether co-maleic anhydride copolymers, polyvinyl pyridine, polyacrylonitrile, polystyrene, poly(methyl methacrylate), poly(butyl methacrylate), polyhydroxy amide with aldehyde, melamine formaldehyde resin, urea formaldehyde resin, water soluble oligomers of the condensate of melamine, water soluble oligomers of urea, water soluble oligomers of formaldehyde, or polymers of any of the following: diacyl chloride, vinyl acetate, acrylic acid, butyl acrylate, or t-butyl acrylate.

10. The multiple layer glass panel of claim 8, wherein said dielectric material is selected from the group consisting of a low molecular weight poly(chlorotrifluoroethylene), perfluorinated polyether, aliphatic hydrocarbons, triethylene glycol bis(2-ethyl hexanoate), and a mixture of triethylene glycol (2-ethyl hexanoate) and triethylene glycol bis(2-ethyl hexanoate).

11. The multiple layer glass panel of claim 8, wherein said agent is selected from the group consisting of anatase titania, rutile titania, barium sulfate, silica, magnesium silicate, calcium carbonate, indium tin oxide, antimony tin oxide, carbon black, zinc oxide, lanthanum hexaboride, gold, silver, copper, platinum, palladium, and alloys of the foregoing.

12. The multiple layer glass panel of claim 8, wherein said agent is selected from the group consisting of titania, silica, carbon black, gold, and silver.

13. The multiple layer glass panel of claim 8, wherein said application of an electric field causes said agent to agglomerate.

14. The multiple layer glass panel of claim 8, wherein said polymeric layer further comprises a plasticizing agent.

15. The multiple layer glass panel of claim 8, wherein said polymeric sheet of said second layer comprises polyethylene terephthalate.

16. The multiple layer glass panel of claim 15, wherein said polyethylene terephthalate is coated with an electrically conductive material selected from the group consisting of indium tin oxide, antimony tin oxide, indium zinc oxide, metallic coatings, polyaniline, and a conductive polymer.

17. The multiple layer glass panel of claim 8, wherein said polymeric sheet of said third layer comprises polyethylene terephthalate.

18. The multiple layer glass panel of claim 17, wherein said polyethylene terephthalate is coated with an electrically conductive material selected from the group consisting of indium tin oxide, antimony tin oxide, indium zinc oxide, metallic coatings, polyaniline, and a conductive polymer.

19. The multiple layer glass panel of claim 8, further comprising a fourth layer comprising poly(vinyl butyral) disposed in contact with said second layer.

20. The multiple layer glass panel of claim 19, further comprising a fifth layer comprising poly(vinyl butyral) disposed in contact with said third layer.

21. The multiple layer glass panel of claim 20, further comprising a sixth layer of glass disposed in contact with said fourth layer and a seventh layer of glass disposed in contact with said fifth layer.

22. A multiple layer glass panel comprising:
a first glass layer having an electrically conductive coating;
a second glass layer having an electrically conductive coating;
a polymeric layer disposed between said first glass layer and said second glass layer, wherein said polymeric layer comprises poly(vinyl butyral);
a plurality of domains distributed throughout said polymeric layer, wherein said domains are in the form of microcapsules comprising a liquid dielectric material encapsulated in a polymeric coating; and,
an agent dispersed in said liquid dielectric material, wherein said agent causes an alteration in the amount of visible light that can be transmitted through said polymeric layer in response to the application of an electric field to said polymeric layer.

23. A method of reducing light transmission through an opening, comprising:
providing a multiple layer glass panel in said opening, wherein said multiple layer glass panel comprises a first layer comprising,
a polymeric layer comprising poly(vinyl butyral);
a plurality of domains distributed throughout said polymeric layer, wherein said domains are in the form of microcapsules comprising a liquid dielectric material encapsulated in a polymeric coating; and,
an agent dispersed in said liquid dielectric material, wherein said agent causes an alteration in the amount of visible light that can be transmitted through said first layer in response to the application of an electric field to said first layer;
a second layer comprising an electrically conductive polymeric sheet disposed in contact with said first layer; and,
a third layer comprising an electrically conductive polymeric sheet disposed in contact with said first layer opposite said second layer; and,
connecting a voltage source to said second layer and said third layer, thereby generating an electric field across said first layer.

24. The method of claim 23, wherein the extent to which said light transmission is reduced is dependent in part on the duration of application of said voltage source.

25. A method of reversibly reducing light transmission through an opening, comprising:
providing a multiple layer glass panel in said opening, wherein said multiple layer glass panel comprises a first layer comprising,
a polymeric layer, comprising poly(vinyl butyral);
a plurality of domains distributed throughout said polymeric layer, wherein said domains are in the form of microcapsules comprising a liquid dielectric material encapsulated in a polymeric coating; and,
an agent dispersed in said liquid dielectric material, wherein said agent causes an alteration in the amount of visible light that can be transmitted through said first layer in response to the application of an electric field to said first layer;
a second layer comprising an electrically conductive polymeric sheet disposed in contact with said first layer; and,
a third layer comprising an electrically conductive polymeric sheet disposed in contact with said first layer opposite said second layer;
connecting a voltage source to said second layer and said third layer, thereby generating an electric field across said first layer; and,
reversing the polarity of said voltage source to said second layer and said third layer, thereby reversing said electric field.

* * * * *